United States Patent [19]
Nakagaki et al.

[11] Patent Number: 5,452,295
[45] Date of Patent: Sep. 19, 1995

[54] CALL DISCONNECTION METHOD AND EXCHANGE EXECUTING THE SAME IN ATM NETWORK

[75] Inventors: Tatsuru Nakagaki; Ryoichi Ishibashi, both of Kawasaki, Japan

[73] Assignee: Fujitsu Limited, Kanagawa, Japan

[21] Appl. No.: 33,000

[22] Filed: Mar. 18, 1993

[30] Foreign Application Priority Data

Mar. 18, 1992 [JP] Japan .................................. 4-061936

[51] Int. Cl.⁶ ............................................. H04J 3/14
[52] U.S. Cl. ................................. 370/58.2; 370/60.1; 370/68.1; 370/110.1; 379/190; 379/191; 379/192
[58] Field of Search ................. 370/60, 94.1, 68.1, 370/110.1, 60.1, 58.2; 379/190–192

[56] References Cited

U.S. PATENT DOCUMENTS

| | | | |
|---|---|---|---|
| 4,598,367 | 7/1986 | DeFrancesco et al. | 379/106 X |
| 4,903,291 | 2/1990 | Tsurufuji et al. | 379/190 X |
| 4,993,018 | 2/1991 | Hajikano et al. | 370/60 |
| 5,142,525 | 8/1992 | Nakatsuma | 370/110.1 X |
| 5,142,653 | 8/1992 | Schefts | 379/16 |
| 5,185,743 | 2/1993 | Murayama et al. | 370/110.1 |
| 5,276,676 | 1/1994 | Horn et al. | 370/17 |

*Primary Examiner*—Douglas W. Olms
*Assistant Examiner*—Russell W. Blum

[57] ABSTRACT

In a call disconnection method and a system for executing the same in an ATM (Asynchronous Transfer Mode) network, a plurality of timers are provided corresponding to each call in an exchange of an ATM network. A connected call is detected, and a data cell is not transmitted for longer than a predetermined time, by using the corresponding timer, and disconnecting the detected call from the ATM network.

6 Claims, 10 Drawing Sheets

Fig.8

| VC 1 | VC 1' |
|------|-------|
| VC 2 | VC 2' |
| VC 3 | VC 3' |
|      |       |

Fig.9

| HEADER | INFORMATION FIELD |
|--------|-------------------|
| ⟵ 5 BYTES ⟶ | ⟵ 48 BYTES ⟶ |

CALL DISCONNECTION METHOD AND EXCHANGE EXECUTING THE SAME IN ATM NETWORK

BACKGROUND OF THE INVENTION

1. Field of the Invention

The present invention relates to a call disconnection method and an exchange executing the same in an ATM (Asynchronous Transfer Mode) network.

2. Description of the Related Art

The ATM is a transfer mode for transferring various broad band and narrow band information, e.g., image, voice, data, etc., and wherein a cell including information having a certain length and a header is transferred.

A number of cells is determined in response to an amount of information. Accordingly, an accounting in the ATM network is decided by the number of cells transmitted through an exchange in the reception side. Namely, the accounting is determined in accordance with the number of cells and the communication distance.

Therefore, by using the above accounting method, when a data cell is not transmitted, if the call is connected, the accounting is not accumulated. Thus, when the burst data which is, for example, used in the data communication is transmitted, even if the data cells are not transmitted for a long time, the call is held during the long time.

In the exchange, whenever the call is held, since a certain frequency band must be secured, the calls exceeding the band wherein the exchange operates cannot be held. For that reason, if some terminal equipment holds a call continuously and does not disconnect the call, in the case of exceeding the band handled by the exchange, when another terminal equipment requests a call, the exchange must reject the request. Thus, a new call cannot be connected.

SUMMARY OF THE INVENTION

An object of the present invention is to realize an efficient communication by detecting a connected call not being utilized for a long time, disconnecting the call in the network, and allotting the band which was allotted to the unutilized call to another call.

According to a first aspect of the present invention there is provided a call disconnection method in an ATM network comprising steps of providing a plurality of timers corresponding to calls in an exchange of the ATM network, detecting the call wherein a data cell of the connected call has not been transmitted for longer than a predetermined time, by using the timer, and disconnecting the detected call from the ATM network.

According to a second aspect of the present invention there is provided an exchange in an ATM network comprising a plurality of timer means provided in the exchange corresponding to calls and for detecting a connected call wherein a data cell of the connected call is not transmitted for longer than a predetermined time, and a control means for disconnecting the detected call from the ATM network.

As mentioned above, the timers are provided in the exchange corresponding to the call and the utilization state of the call is managed. Then, the time after the data cell is received is measured, and when a timer count reaches a predetermined value, the timer counted call is detected and disconnected.

Other features and advantages of the invention will be apparent from the following description with reference to the accompanying drawings.

BRIEF DESCRIPTION OF THE DRAWINGS

FIG. 8 is a diagram showing a conversion table of VCI;

FIG. 9 is a diagram showing a constitution of a cell;

DESCRIPTION OF THE PREFERRED EMBODIMENTS

Figure 1:
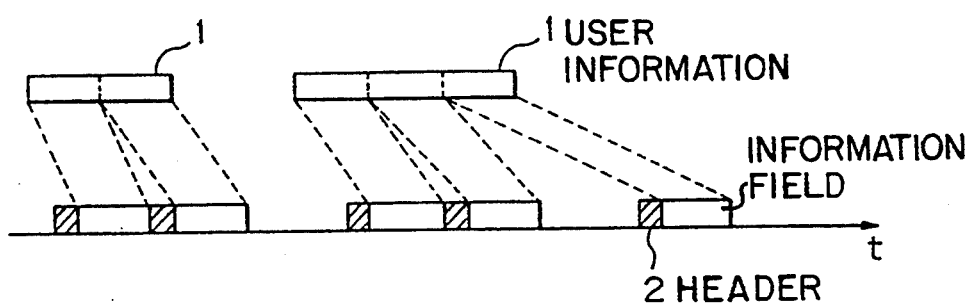
FIG. 1 is an explanatory diagram showing a unit of transmitted information in an ATM network.
Figure 2:
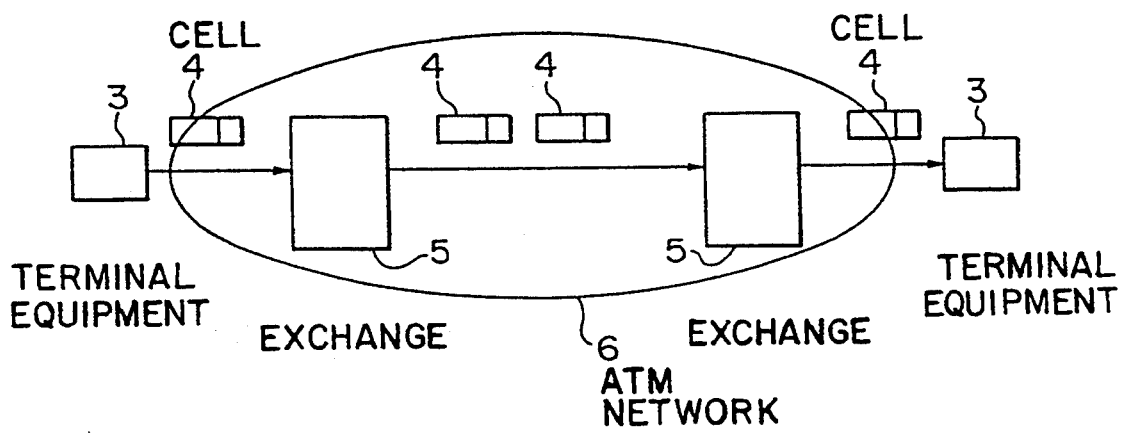
FIG. 2 is a block diagram showing transmission routes of data cells in an ATM network as an example.

An information unit in an ATM network executing this invention is explained with reference to FIG. 1. In this ATM network, various broad band and narrow band information, for example, image, voice, data, etc., is transmitted, which is divided into a number of units called user information 1 and with a header 2 attached thereto. In FIG. 2, a transmission route of the above information 1 in the ATM network is shown. Namely, a unit (cell 4) of the above user information transmitted from a terminal equipment 3 is supplied to an exchange 5 of the transmission side, switched through the exchange 5, arrives at the exchange 5 of the reception side through a multiplexed line, is further switched, and is supplied to the reception terminal equipment 3. In FIG. 2, 6 shows an ATM network.

Figure 3:
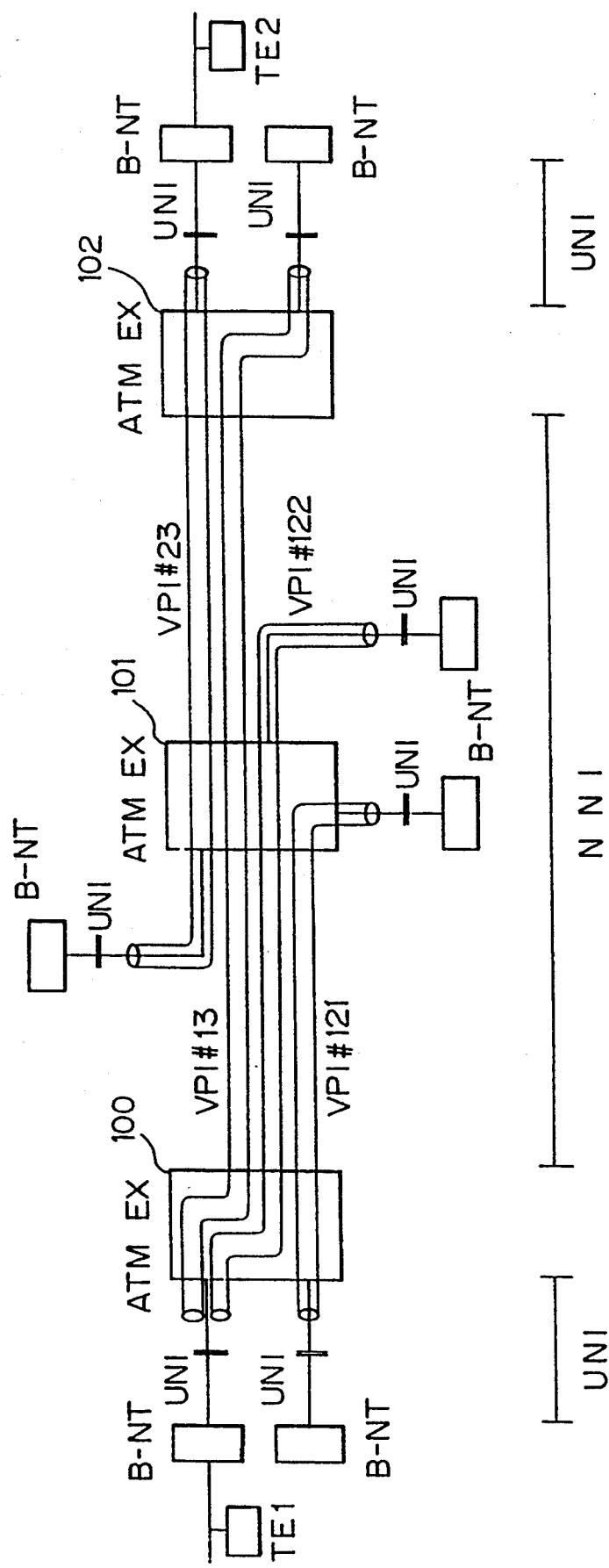
FIG. 3 is a detailed block diagram showing transmission routes of data cells in an ATM network as another example.
Figure 4:
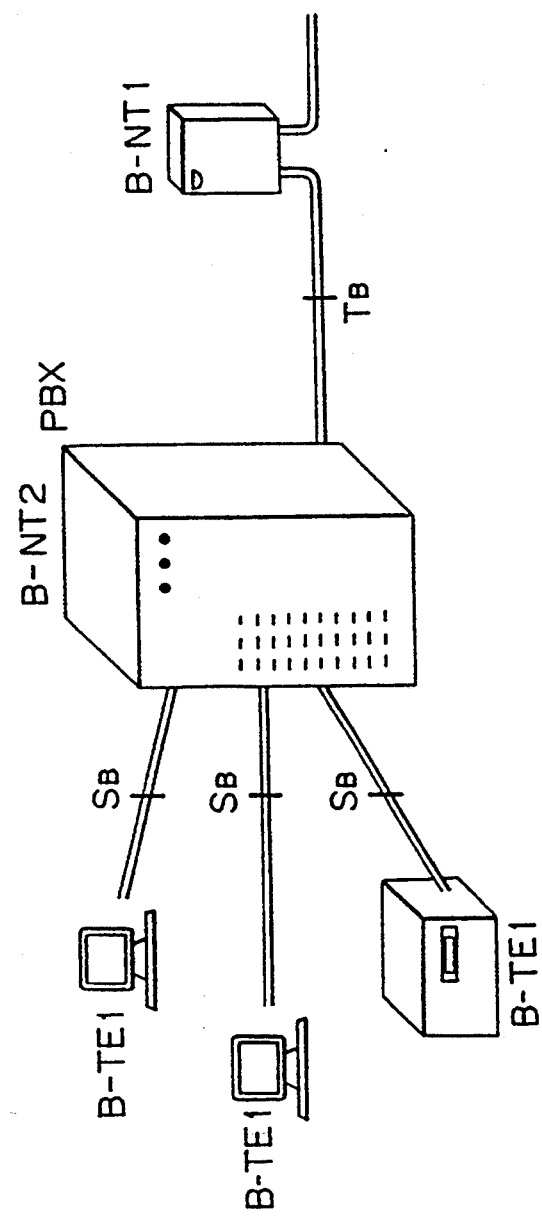
FIG. 4 is a diagram illustrating an example of terminal equipment connected to an ATM network.
Figure 5:
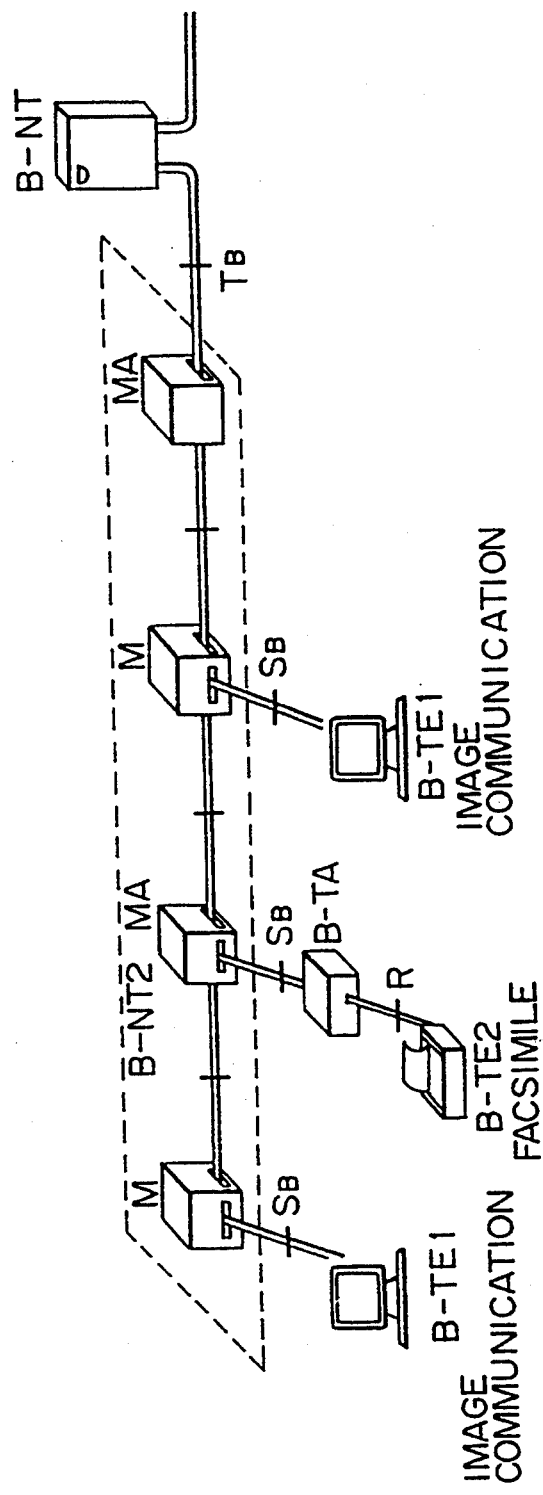
FIG. 5 is a diagram illustrating another example of terminal equipment connected to an ATM network.

The ATM network shown in FIG. 2 is further explained with reference to FIG. 3. In this example, three ATM exchanges (EX) are used and connected to an ordinary line exchange network (conf. FIGS. 4 and 5) through B-NT (network termination). In an inner network of FIG. 3, information is transmitted utilizing a cell unit, is multiplexed, and is then passed through selected virtual paths. Each virtual path has a VPI (Virtual Path Identifier) and a plurality of virtual channels. Each virtual channel has a VCI (Virtual Channel Identifier).

The transmitted cell is allotted the VPI and VCI with reference to the start point and target point data, etc., and is transmitted in accordance with the VPI and VCI. In FIG. 3, UNI designates a User-Network Interface, and NNI designates a Network Node Interface.

The terminal of FIG. 4 is an example of a PBX (Private Branch Exchange) wherein the information exchange is executed as an ordinary line network. An example of FIG. 5 shows image transmission and facsimile using adapters (M or MA).

Figure 10:
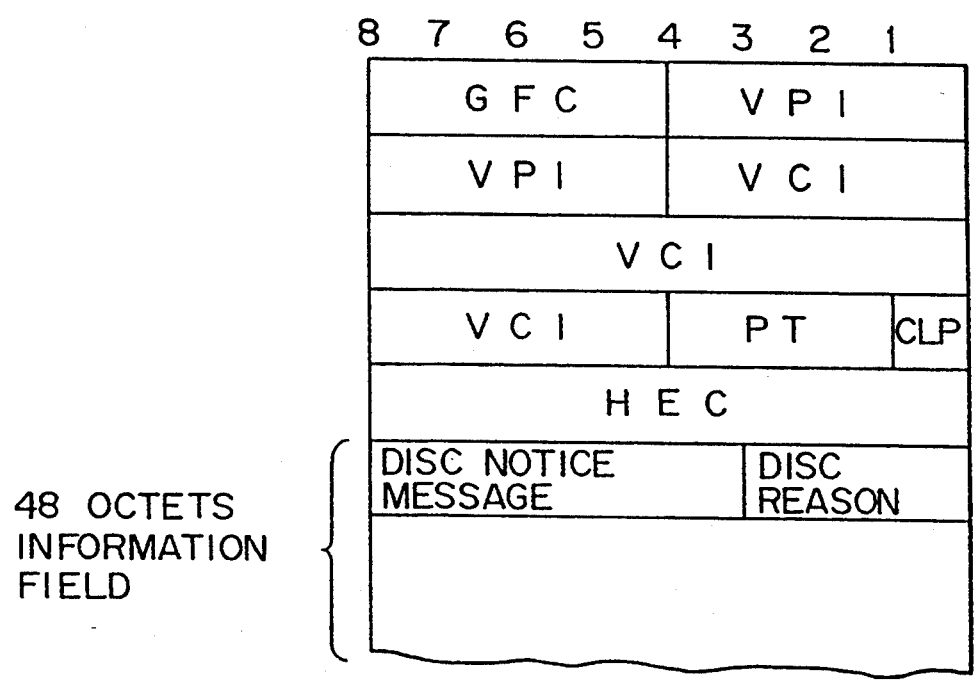
FIG. 10 is a diagram showing an inside constitution of the cell.

The VCI allotted to the cell is converted whenever the cell passes through the exchange. For the conversion, a VCI conversion table is used. An example of the conversion table is shown in FIG. 8. FIG. 9 shows the constitution of a cell wherein the header is comprised of five bytes and the remaining 48 bytes comprise an information field. Namely, as shown in FIG. 10, the first to fifth lines (GFC to HEC) are a header.

The information field first includes data regarding cell transmission and after that is used for the data transmission. The header comprises GFC, VPI, VCI, PT, CLP, and HEC as shown in FIG. 10.

The content of the disconnection notice cell, described below, is transmitted by using the information field.

Figure 6:
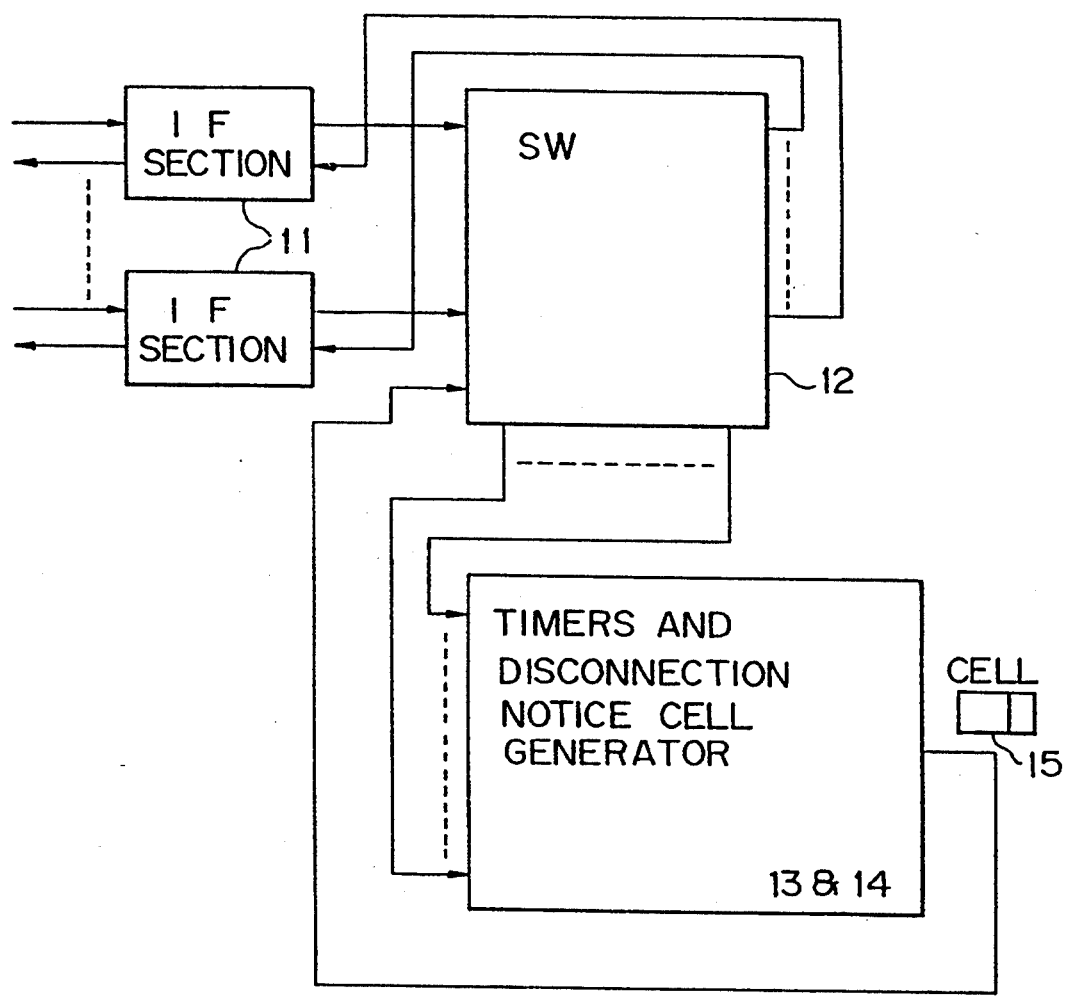
FIG. 6 is a block diagram of an apparatus executing a call disconnection method in an ATM network according to an embodiment of the present invention.
Figure 11:
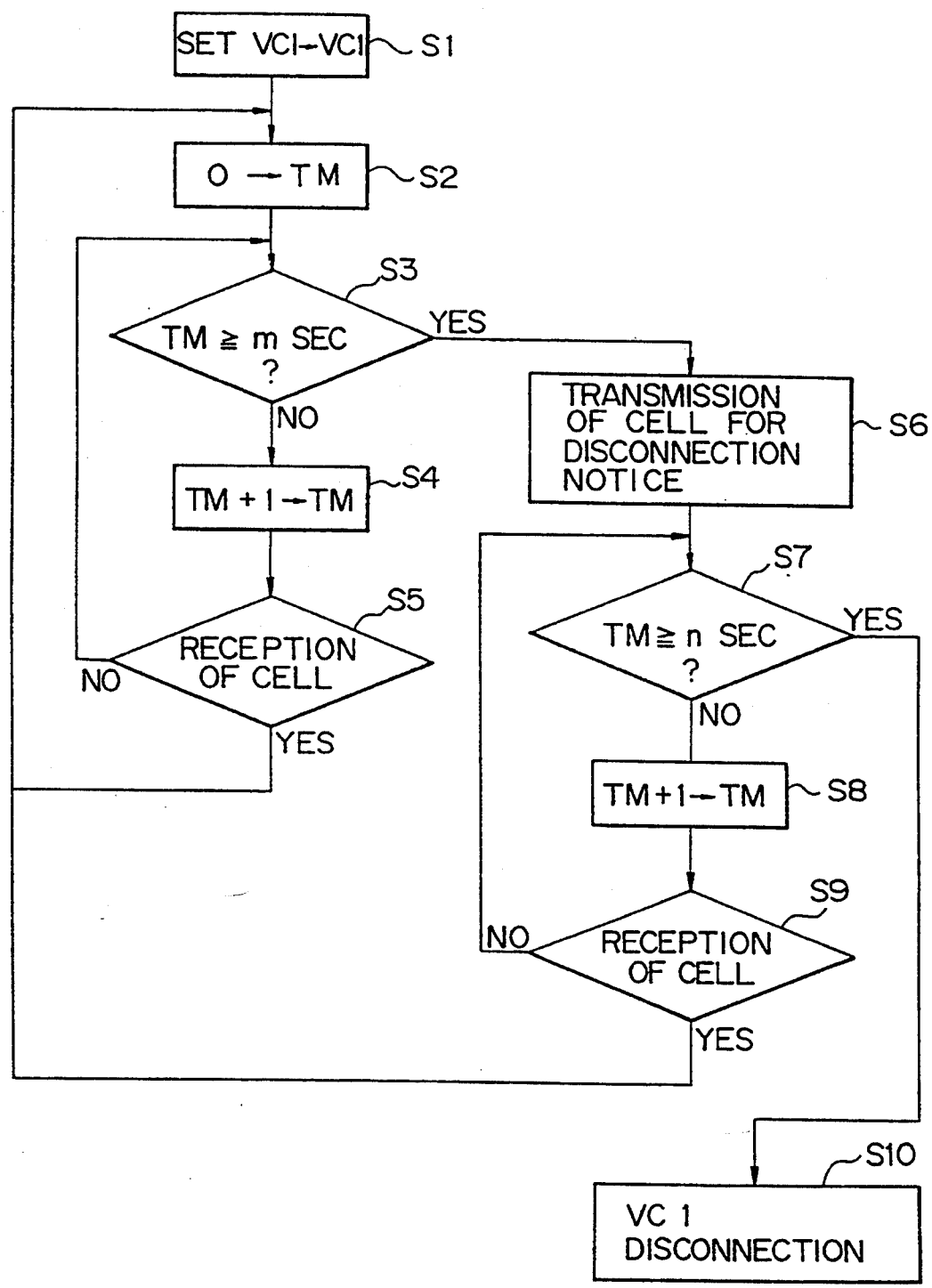
FIG. 11 is a flowchart showing processes for executing a method according to the present invention.

FIG. 11 shows a flowchart of the processing steps according to an embodiment of the present invention and FIG. 6 shows a block diagram of the ATM exchange executing the processing steps.

FIG. 11 shows the processing steps (S1–S10) when the VCI of a call is VC1 and the cell is not transmitted for a long time.

S1: VC1 is set to a VCI value.

S2: A timer (TM1) 14 corresponding to the VC1 in the exchange is reset to zero and starts to count.

S3: When the timer shows m seconds, the process goes to S6. When the timer shows less than m seconds, the process goes to S4.

S4: The timer value is increased.

S5: When the cell designated VC1 is received, the process returns to S2 and when the cell designated VC1 is not received, the process returns to S3.

S6: A transmission request for the disconnection notice cell is given to a disconnection notice cell generation 13 in the exchange.

S7: When the timer reaches n seconds, the process goes to S10 and when the timer value is less than n seconds, the process goes to S8.

S8: The timer value is increased.

S9: When the cell designated VC1 is received, the process returns to S2, and when the cell designated VC1 is not received, the process returns to S7.

S10: The call designated VC1 is disconnected.

In FIG. 6, an input or output line in the left side is connected to the terminal equipment or a multiplexed transmission line, and the information from the terminal equipment is switched in a switch portion 12 through IF (Interface) section 11, and is connected to another terminal equipment through the transmission line and a switch portion 12 of another exchange. When a cell belonging to one of VC1 to VCn is received, the corresponding one of timers TM1 to TMn starts counting from zero. If the count reaches m seconds, the request for disconnection notice cell generation is supplied from the counter. Then, the disconnection notice cell 15 is supplied to the corresponding terminal equipment from the disconnection notice cell generator 13 through the switch portion 12, and the call disconnection is notified to the respective terminal equipment 3. Or, the disconnection notice cell 15 is supplied to the respective terminal equipment 3 through the switch portion 12 and the transmission line. In FIG. 6, a plurality of timers and the disconnection notice cell generator 13 are shown as one block. These are shown in detail in FIG. 7. When the timer count exceeds m seconds and reaches n seconds, the corresponding call of VC1 to VCn is disconnected.

The call setup and the call disconnection from a transmission station exchange (ATM EX 100) is executed as follows. First, the call setup is started when the transmitting user (TE1) sends a SETUP (request for call setup) message. Then, CALL PROC (Call Proceeding) is transmitted, the reception user (TE2) starts to call, and an ALERT (Alerting) message is sent to the user (TE1). Next, the user (TE2) responds, and then the CONN (Connect) message is sent to the user TE1. The channel VCI and VPI is setup and starts to communicate.

The call setup between the exchange 100 in the transmitting side and the exchange 102 in the reception side in the B-ISDN network, is started when the address message (IAM: Initial Address Message) corresponding to the SETUP message is transmitted. In the exchange 102, when all the information necessary for the call setup is obtained, the address complete message (ACM) is returned to the transmission station side. In the telephone call, when the user TE2 is called, the call is sent to the exchange 100 by using a call progress message (CPG), and simultaneously the call sound is sent to the user TE1 from the exchange 102. Accordingly, in this case, the exchange 100 sets the communication route from the user TE2 to the user TE1 at the same time as the IAM supply so that the call sound can be heard by the user TE1. In response to the information from the user TE2 the answer message (ANM) is supplied.

After the communication starts, namely, the channel (VCI, VPI) of the user TE1 is setup completely, the exchange 100 starts to operate the timer corresponding to this channel, and supervises the reception of the cell having these VCI and VPI.

When the cell having the VCI and VPI is not received for a certain time (e.g., m seconds), the disconnection notice cell is supplied to the users TE1 and TE2 using the VCI and VPI.

After the disconnection notice cell is transmitted, when the cell having the VCI and VPI is not received again for another certain time (e.g., n seconds), the disconnection message is transmitted forcedly to the users TE1 and TE2.

Figure 12:
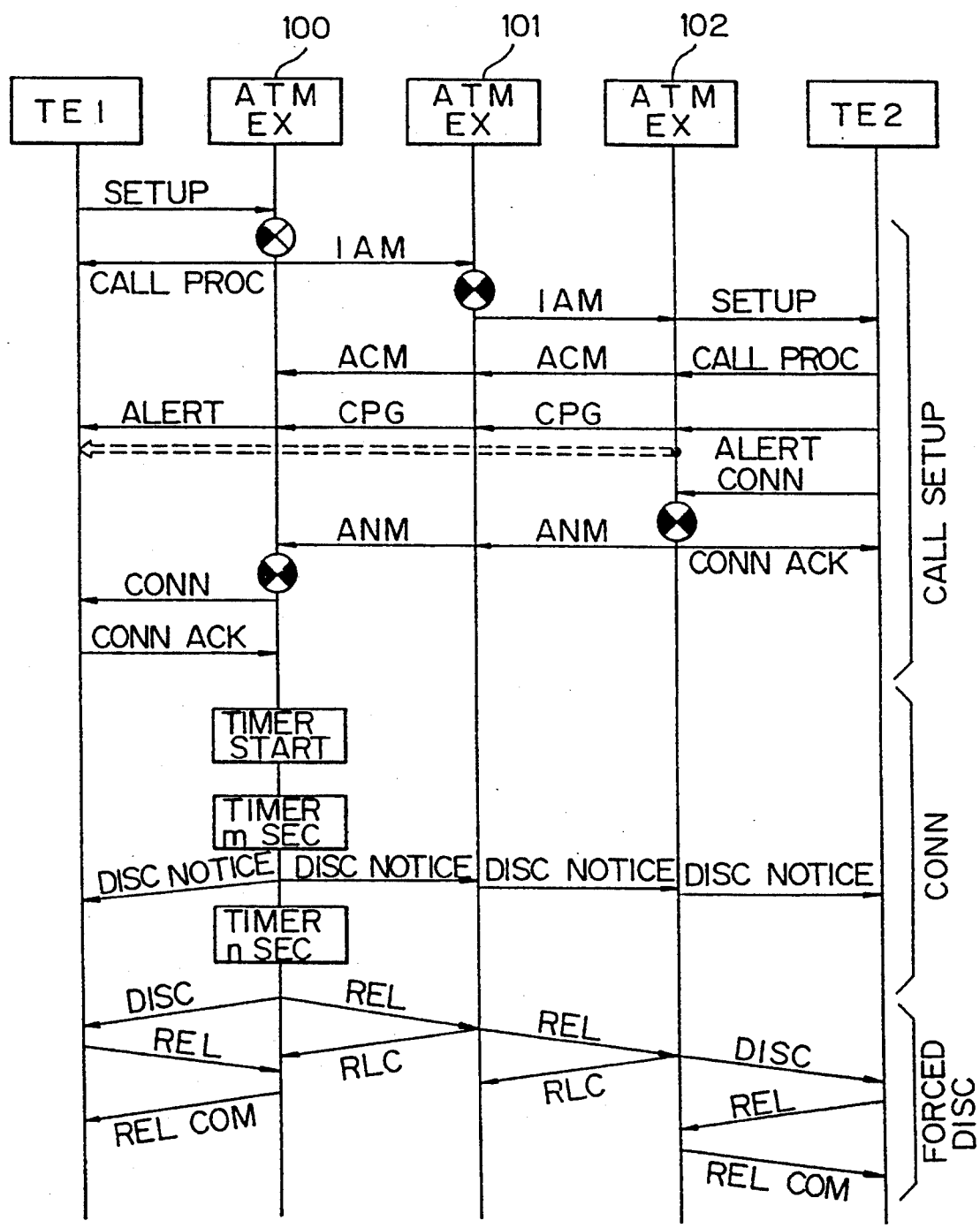
FIG. 12 is an explanatory diagram illustrating call setup and call disconnection sequences in a network corresponding to the network of FIG. 3.

The transmission station exchange supplies the disconnect (DISC) signal to the user (TE1) and the release (REL) signal to the relay station exchange (ATM EX 101). The relay station exchange supplies a release complete (RLC) signal to the transmission station exchange and a REL signal to the reception station exchange (ATM EX 102). The user (TE1) supplies REL to the transmission station exchange and the transmission station exchange supplies release complete (REL COM) to the user (TE1). The reception station exchange supplies a RLC signal to the relay station exchange, and a DISC signal to the user (TE2). The user (TE2) supplies a REL signal to the reception station exchange, and the reception station exchange supplies release complete (REL COM) to the user (TE2). Thus the disconnection is completed. At this time, following to the release of the call, the VCI conversion table and the corresponding VPI and VCI set in the memory 18 are cleared. These sequences are shown in FIG. 12. FIG. 12 shows a call setup and disconnection sequence in a network corresponding to the network of FIG. 3.

Figure 7:
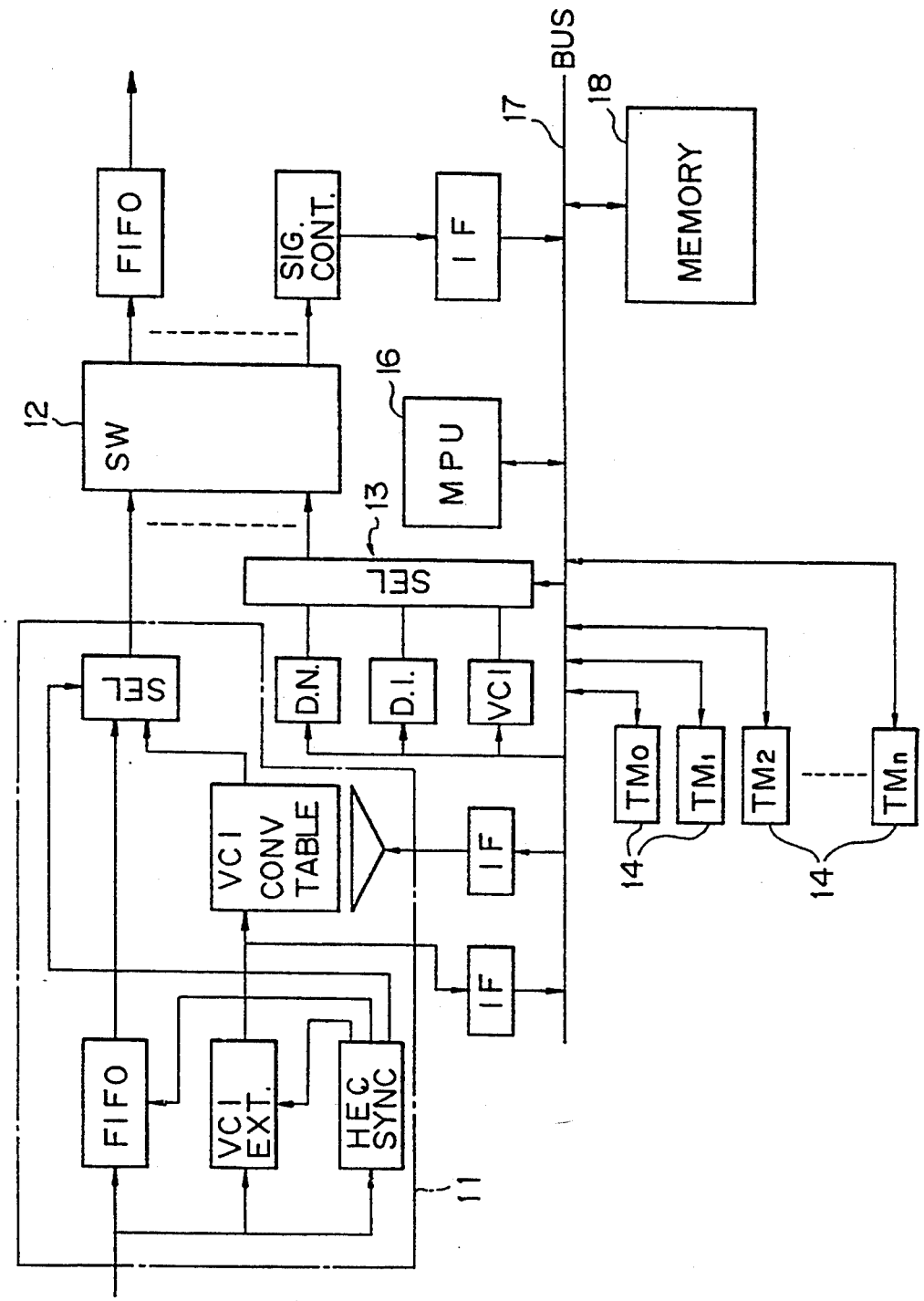
FIG. 7 is a detailed block diagram of the apparatus of FIG. 6.

FIG. 7 shows a detailed block diagram of the ATM exchange of FIG. 6. A portion enclosed by a dot-dash line in the upper left area corresponds to the IF section 11 in FIG. 6. A VCI extraction portion extracts the VCI by synchronization using a HEC section. A VCI conversion table is shown in detail in FIG. 8. A block D.N. is a disconnection notice cell, and a block D.I. is a disconnection informing cell. A control signal from the SW portion 12 is supplied to an MPU (Microprocessor Unit) 16 through a signaling controller and a bus 17, and the MPU 16 controls the respective elements incorporating a memory 18. The disconnection notice cell is also supplied to the reception side user through the switch portion 12. In the terminal equipment in the ATM network, a monitor or display lamp is provided and the call disconnection notice is displayed to the user.

The memory 18 stores information of the VCI, VPI, requesting band, a kind of terminal equipment or the like as stored data.

According to the present invention, efficient communication can be realized by providing timers in an exchange, detecting a call not used for a long time, disconnecting the call from a network side, and allotting the band allotted to the above call, to another call.

We claim:

1. A call disconnection method of a communication network, in which information is transmitted with a fixed bit length cell including a signalling field with virtual channel identification for each call and an information field, the method comprising the steps of:

providing a plurality of timers in an exchange of the communication network;

detecting a call set-up request from a subscriber, and assigning an idle virtual channel to a call for which the set-up request was detected;

setting one of said timers corresponding to said call, said one of said timers counting up unless it detects a cell including the virtual channel identification for said call;

monitoring at said exchange whether or not said one of said timers shows a longer time than a predetermined time; and issuing signals at said exchange for disconnecting the call when the timer shows the longer time.

2. A call disconnection method as set forth in claim 1, wherein when said disconnecting of the call in which the cell is not transmitted for longer than a predetermined time is carried out, said method further comprises the steps of supplying from said exchange a call disconnection notice cell to terminal equipment in advance and providing information on call disconnection to the terminal equipment.

3. A call disconnection method as set forth in claim 2, further comprising the steps of providing a monitor or a display lamp in the terminal equipment for receiving the information from said exchange of the call disconnection notice and displaying the information of the call disconnection notice to a user.

4. A switching system in combination with a communication network, in which information is transmitted with a fixed bit length cell including a signaling field with virtual channel identification for each call and an information field, comprising:

a plurality of timers provided in an exchange of the communication network; and a call processor at said exchange for detecting a call set-up request from a subscriber, and for assigning an idle virtual channel to a call for which the set-up request was detected;

one of said timers corresponding to said call being set by the call processor when assigning the idle virtual channel, and being reset by the call processor when a cell including virtual channel identification for the call has been detected;

said call processor monitoring at said exchange whether said one of said timers shows a longer time than a predetermined time, and disconnecting the call when the timer shows the longer time.

5. A switching system as set forth in claim 4, further comprising a disconnection notice cell generator at said exchange for supplying a call disconnection notice cell to a connected terminal equipment in advance and for providing information on call disconnection to the terminal equipment, when the disconnection of the call in which the cell is not transmitted for longer than a predetermined time is carried out by said call processor.

6. A switching system as set forth in claim 5, further comprising a monitor or a display lamp in the terminal equipment for receiving the information of the call disconnection notice from said exchange, for displaying the information of the call disconnection notice to a user.

* * * * *